(12) United States Patent
Dalton et al.

(10) Patent No.: US 11,329,589 B2
(45) Date of Patent: May 10, 2022

(54) GROUND FAULT DETECTION METHODS ON VARIABLE FREQUENCY DRIVE SYSTEMS

(71) Applicant: Joy Global Underground Mining LLC, Warrendale, PA (US)

(72) Inventors: Peter M. Dalton, New South Wales (AU); Michael Jordan, Cranberry, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 621 days.

(21) Appl. No.: 13/842,707

(22) Filed: Mar. 15, 2013

(65) Prior Publication Data

US 2013/0257334 A1    Oct. 3, 2013

Related U.S. Application Data (60) Provisional application No. 61/616,830, filed on Mar. 28, 2012.

(51) Int. Cl.
    *H02P 27/04*    (2016.01)
    *H02H 3/17*     (2006.01)
    *H02H 3/16*     (2006.01)

(52) U.S. Cl.
    CPC .......... *H02P 27/04* (2013.01); *H02H 3/162* (2013.01); *H02H 3/17* (2013.01); *H02H 3/165* (2013.01)

(58) Field of Classification Search
    CPC .......... H02H 3/162; H02H 3/17; H02H 3/165; H02P 27/04
    USPC .................................. 361/30, 47; 318/504
    See application file for complete search history.

(56) References Cited

U.S. PATENT DOCUMENTS

| | | | | |
|---|---|---|---|---|
| 3,697,810 A | * | 10/1972 | Wilson | H02H 3/347 361/44 |
| 3,764,853 A | * | 10/1973 | Beachley, Jr. | H02H 3/347 361/44 |
| 3,840,783 A | * | 10/1974 | Eckart | H02H 3/165 361/47 |
| 3,855,501 A | | 12/1974 | Agnew | |

(Continued)

FOREIGN PATENT DOCUMENTS

| | | |
|---|---|---|
| CN | 1119796 A | 4/1996 |
| CN | 101507072 A | 8/2009 |

(Continued)

OTHER PUBLICATIONS

Patent Examination Report No. 1 from IP Australia for Application No. 2013202491 dated Sep. 16, 2014 (5 pages).

(Continued)

*Primary Examiner* — Eduardo Colon Santana
*Assistant Examiner* — Devon Joseph
(74) *Attorney, Agent, or Firm* — Michael Best & Friedrich LLP (57) ABSTRACT

A mining machine including a motor, an adjustable speed drive providing a voltage to the motor, the voltage having an excitation component comprising a magnitude and a frequency for operating the motor at a desired speed and including an additional voltage component for use in detecting a ground fault condition, and a ground fault relay for detecting a ground fault current when the ground fault current exceeds a predetermined threshold.

13 Claims, 6 Drawing Sheets

(56) References Cited

U.S. PATENT DOCUMENTS

| | | | | |
|---|---|---|---|---|
| 4,542,432 A * | 9/1985 | Nichols, III | H02H 3/33 | 361/44 |
| 5,548,466 A * | 8/1996 | Smith | H02H 3/05 | 361/113 |
| 5,675,465 A * | 10/1997 | Tanaka | G01R 31/346 | 361/42 |
| 5,691,643 A * | 11/1997 | Ishiguro | H02H 7/0833 | 324/510 |
| 5,811,976 A | 9/1998 | Fischer | | |
| 5,945,802 A * | 8/1999 | Konrad | G01R 31/52 | 318/807 |
| 6,327,124 B1 * | 12/2001 | Fearing et al. | 361/31 | |
| 6,439,856 B1 * | 8/2002 | Ivey | 417/63 | |
| 6,473,281 B1 * | 10/2002 | Kornblit | H02H 3/0935 | 340/650 |
| 6,671,144 B1 * | 12/2003 | Langford | H02H 1/0015 | 361/42 |
| 6,782,329 B2 | 8/2004 | Scott | | |
| 6,798,112 B1 * | 9/2004 | Daley | G01R 31/346 | 310/179 |
| 6,844,736 B2 * | 1/2005 | Weems | G01R 31/52 | 324/509 |
| 6,864,673 B2 | 3/2005 | Titschert et al. | | |
| 6,952,335 B2 | 10/2005 | Huang et al. | | |
| 7,050,279 B2 | 5/2006 | Nojima | | |
| 7,068,040 B2 | 6/2006 | Stitt | | |
| 7,323,880 B2 | 1/2008 | Stitt | | |
| 7,378,761 B2 | 5/2008 | Callen et al. | | |
| 7,529,069 B1 | 5/2009 | Weems, II et al. | | |
| 7,612,972 B2 | 11/2009 | Battani et al. | | |
| 7,643,262 B2 | 1/2010 | Titschert et al. | | |
| 7,719,285 B2 | 8/2010 | Johansson et al. | | |
| 7,808,245 B2 | 10/2010 | Lindsey et al. | | |
| 7,834,573 B2 | 11/2010 | Lindsey et al. | | |
| 7,872,846 B2 | 1/2011 | Titschert et al. | | |
| 7,978,446 B2 * | 7/2011 | Lindsey | H02H 7/268 | 361/42 |
| 8,085,514 B2 | 12/2011 | Taylor | | |
| 8,085,517 B2 | 12/2011 | Weems, II et al. | | |
| 8,107,267 B2 | 1/2012 | Tallam et al. | | |
| 8,164,344 B2 | 4/2012 | Yano et al. | | |
| 8,334,670 B2 | 12/2012 | Meyer, III | | |
| 8,355,226 B2 * | 1/2013 | Yoshida | B60L 3/12 | 361/30 |
| 8,373,950 B2 * | 2/2013 | Yano et al. | 361/42 | |
| 8,472,154 B2 * | 6/2013 | Rivers, Jr. | H02J 3/1828 | 361/42 |
| 8,531,804 B2 | 9/2013 | Weems, II et al. | | |
| 8,536,877 B2 | 9/2013 | Moon et al. | | |
| 8,559,143 B2 | 10/2013 | Yasuoka et al. | | |
| 8,593,150 B2 * | 11/2013 | Vrankovic | G01R 31/52 | 324/509 |
| 2003/0197989 A1 * | 10/2003 | Nojima | B60L 3/00 | 361/47 |
| 2006/0056118 A1 | 3/2006 | Huczko et al. | | |
| 2008/0018309 A1 * | 1/2008 | Erdman et al. | 322/20 | |
| 2008/0100976 A1 * | 5/2008 | Huczko | H02H 9/008 | 361/79 |
| 2008/0123226 A1 * | 5/2008 | McGinn | H02H 3/16 | 361/42 |
| 2008/0159729 A1 * | 7/2008 | Hong et al. | 396/133 | |
| 2009/0160454 A1 * | 6/2009 | Johansson | H02H 3/17 | 324/509 |
| 2009/0219656 A1 * | 9/2009 | Lindsey | H02H 7/268 | 361/42 |
| 2009/0226309 A1 * | 9/2009 | Reuter | 415/182.1 | |
| 2011/0080676 A1 * | 4/2011 | Yoshida et al. | 361/30 | |
| 2012/0112758 A1 * | 5/2012 | Weems, II | G01R 31/08 | 324/509 |
| 2012/0212172 A1 * | 8/2012 | Valdez | G01R 31/52 | 318/805 |
| 2012/0249154 A1 | 10/2012 | Dao et al. | | |
| 2013/0043722 A1 | 2/2013 | Posma | | |
| 2013/0120882 A1 * | 5/2013 | Love | H02H 3/162 | 361/42 |
| 2013/0257334 A1 * | 10/2013 | Dalton et al. | 318/504 | |
| 2013/0258537 A1 | 10/2013 | Wylie et al. | | |
| 2013/0322133 A1 * | 12/2013 | Li | H02H 3/52 | 363/37 |
| 2015/0346263 A1 * | 12/2015 | Curtis | G01R 31/52 | 324/509 |
| 2016/0154046 A1 * | 6/2016 | Dong | G01R 31/008 | 324/509 |
| 2016/0276825 A1 * | 9/2016 | Abdel-baqi | H02P 29/0241 | |

FOREIGN PATENT DOCUMENTS

| | | | | |
|---|---|---|---|---|
| CN | 102033186 A | | 4/2011 | |
| EP | 0 553 935 | * | 8/1993 | F04B 37/08 |
| WO | 2011153581 | | 12/2011 | |

OTHER PUBLICATIONS

2nd Examination Report from the Australian Patent Office for Application No. 2013202491 dated Aug. 28, 2015 (3 pages).
First Office Action from the State Intellectual Property Office of the People's Republic of China for Application No. 201310192366.9 dated Nov. 28, 2016 (20 pages).
Second Office Action from the State Intellectual Property Office of the People's Republic of China for Application No. 201310192366.9 dated Aug. 22, 2017 (17 pages with English Translation included).
Chinese Third Office Action for Application No. 201310192366.9 dated Mar. 23, 2018 (43 pages including English translation).
Chinese Fourth Office Action for Application No. 201310192366.9 dated Aug. 31, 2018 (12 pages including English translation).

* cited by examiner

GROUND FAULT DETECTION METHODS ON VARIABLE FREQUENCY DRIVE SYSTEMS

BACKGROUND

Embodiments of the invention relate to methods and systems for controlling drive systems, such as a variable frequency drive system used in mining equipment.

SUMMARY

Variable frequency drives ("VFDs") allow alternating current ("AC") motors to operate at different speeds by generating AC voltage at frequencies other than the fixed 50 Hz or 60 Hz of a utility supply. In particular, to operate a motor at a low speed, voltage of low frequency and magnitude is generated and used by the VFD to power the motor. Because the magnitude and the frequency of the voltage are reduced, current generated by any ground fault is lower than normal, which is difficult to detect using conventional fault detection methods.

Therefore, embodiments of the invention provide methods and systems for detecting ground faults at low motor speeds. In particular, embodiments of the invention add a common voltage to all power phases. The added voltage allows reliable detection of ground faults at low speeds, which may be required by the Mine Safety and Health Administration ("MSHA") and other regulatory agencies.

In one embodiment, the invention provides a mining machine comprising a motor, an adjustable speed drive providing a voltage to the motor, the voltage having an excitation component comprising a magnitude and a frequency for operating the motor at a desired speed and including an additional voltage component for use in detecting a ground fault condition, and a ground fault relay for detecting a ground fault current when the ground fault current exceeds a predetermined threshold.

In another embodiment the invention provides a method for detecting a ground fault of a mining machine including a motor, an adjustable speed drive, and a ground fault relay. The method comprising generating, at the adjustable speed drive, a three-phase voltage for the motor, each phase of the three-phase voltage including an additional voltage signal, the additional voltage signal effecting a ground fault current; providing the three-phase voltage to the motor; detecting a ground fault current between the motor and the adjustable speed drive; and outputting an indication of a ground fault when the ground fault current exceeds a predetermined threshold.

Other aspects of the invention will become apparent by consideration of the detailed description and accompanying drawings.

BRIEF DESCRIPTION OF THE DRAWINGS

FIG. 2c schematically illustrates a ground fault relay included in the power center of FIG. 2a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Figure 1A:
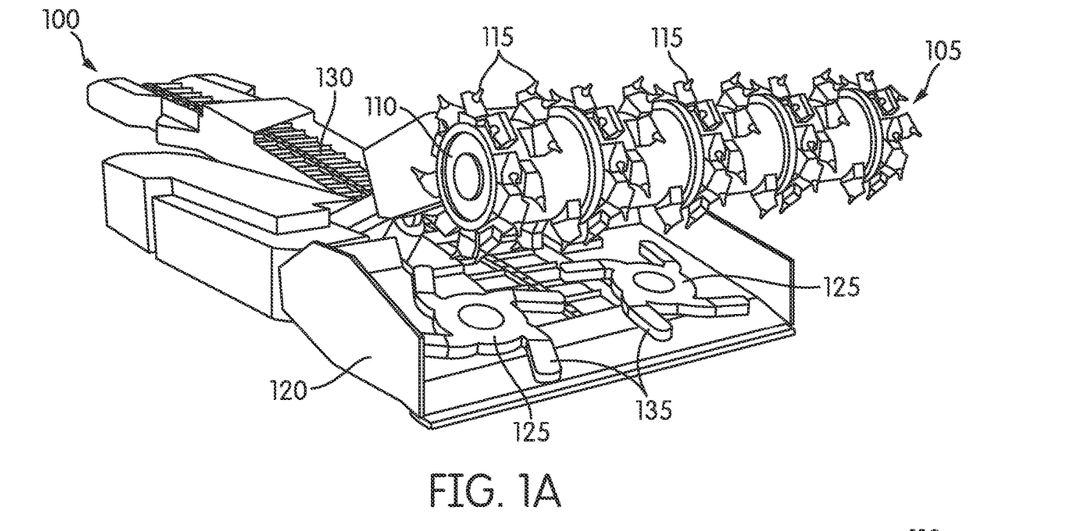
FIGS. 1a-c illustrate a mining machine according to one embodiment of the invention.
Figure 1B:
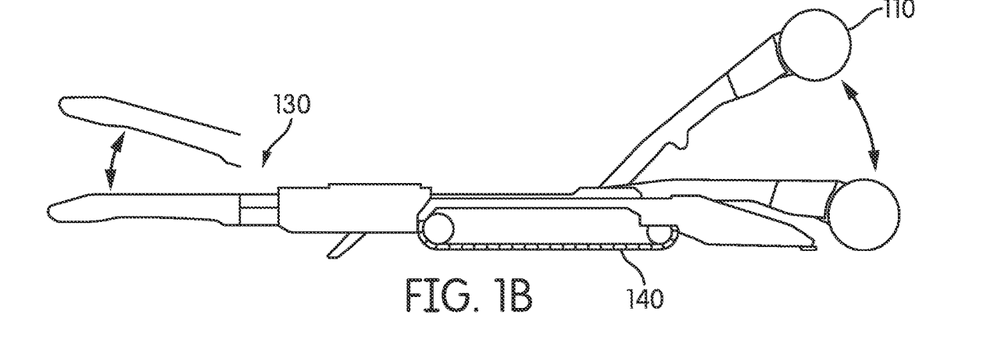
Figure 1C:
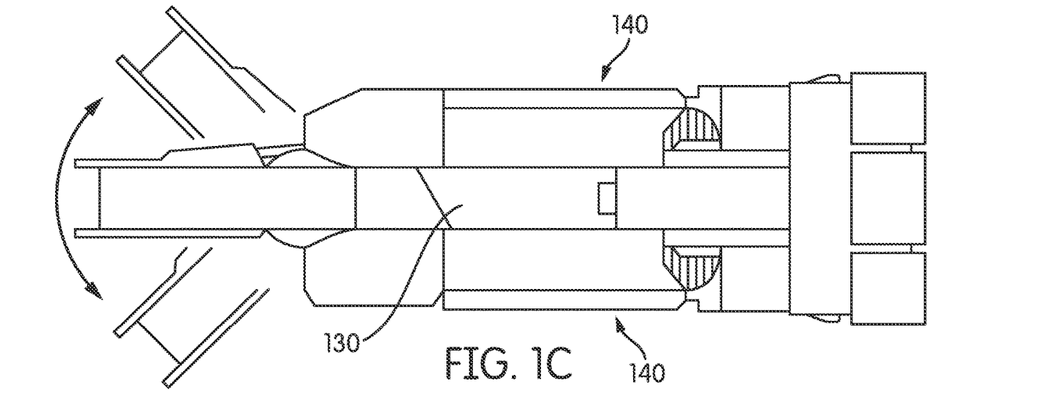

FIGS. 1a-c illustrate a mining machine 100, such as a longwall shearer or a continuous miner. Although illustrated as a continuous miner, in other embodiments, the mining machine 100 is a rope shovel, a hybrid mining shovel, a dragline excavator, or other type of industrial machine or mining machine. The mining machine 100 includes a cutter system 105, which includes rotating cutters 110 with teeth 115. The teeth 115 scrape ore (e.g., coal) from a ceiling in a mine shaft. The cutter system 115 is rotationally driven by a pair of motors via a gear box. In particular, the gear box receives the rotational output of the pair of motors and uses the output to drive the cutter 110. Falling ore is gathered in a collecting tray 120 and funneled by gathering heads 125 toward a conveyor 130. The gathering heads 125 are each rotated by a separate motor. Arms 135 push ore from the collecting tray 120 onto the conveyor 130. The mining machine 100 further includes a set of left and right tracks 140 to provide movement of the machine 100. Each set of tracks is driven by a separate motor.

Figure 2A:
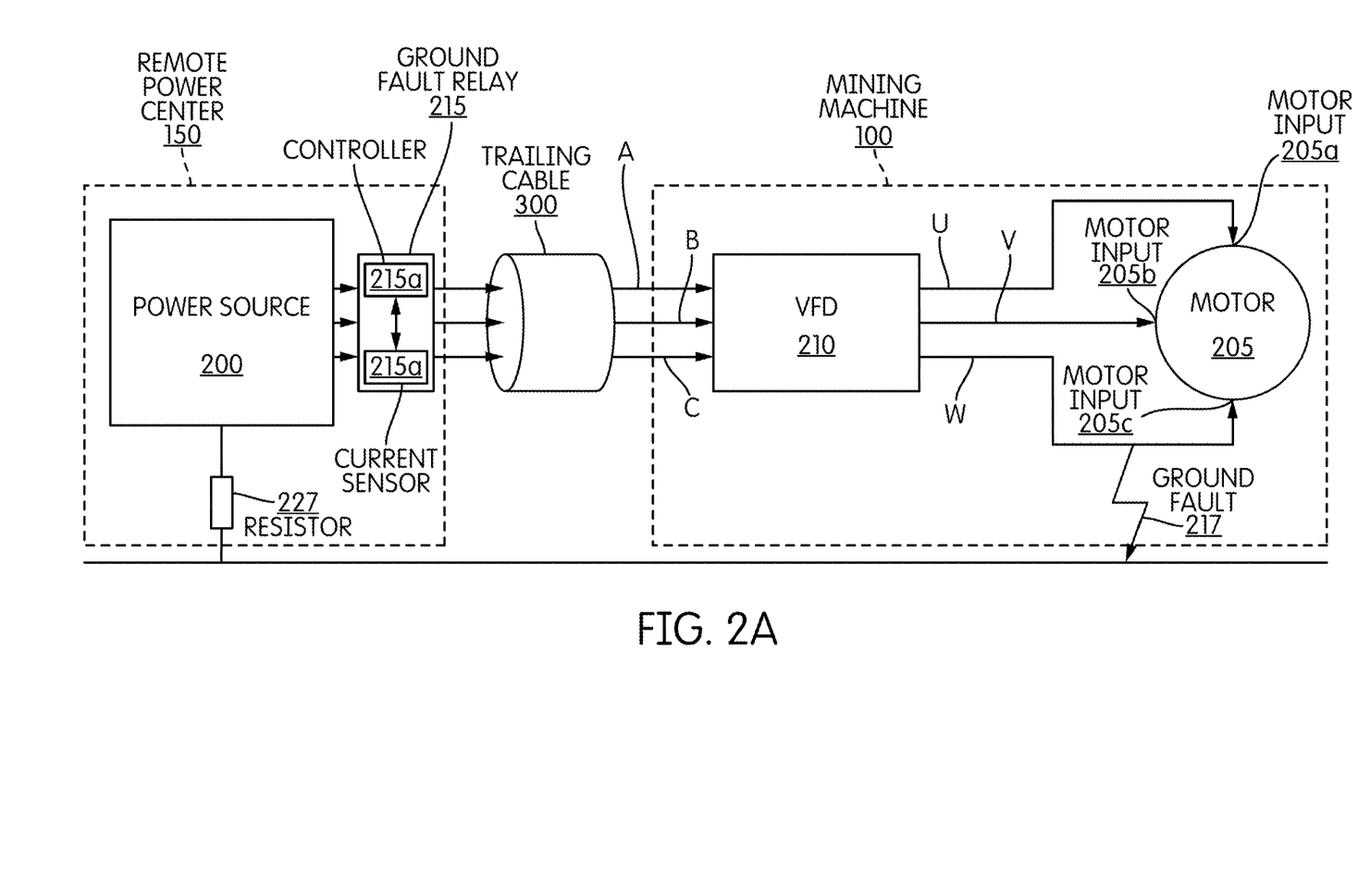
FIG. 2a schematically illustrates the mining machine of FIG. 1 connected to a remote power center.

As illustrated in FIG. 2a, the mining machine 100 includes a variable frequency drive ("VFD") 210 connected to a motor 205. A trailing cable 300 connects the mining machine 100 to a remote power center 150. The remote power center 150 includes a power source 200, one or more ground fault relays 215 and a neutral grounding resistor (NGR) or neutral earthing resistor (NER) 227 which connects the power source 200 to earth or ground. In the example shown in FIG. 2a, the NGR is 1100 ohms. In other embodiments, the NGR may be a different value. It should be understood that only a single motor and a single VFD is illustrated in FIG. 2a to simplify the following explanation. The mining machine 100 can include multiple motors and multiple VFDs, and embodiments explained herein may be applied to each motor and each VFD of the mining machine 100. In the illustrated embodiment, the power source 200 provides three-phase (A, B, C) alternating current ("AC"). In some embodiments, the power source 200 is an AC power source providing approximately 950 volts at approximately 50 Hz to approximately 60 Hz.

The motor 205 is an AC electric motor. In some embodiments, the motor 205 is a three-phase AC electric motor. In some embodiments, the motor 205 is an AC induction motor. In other embodiments the motor 205 is an AC synchronous motor.

Figure 2B:
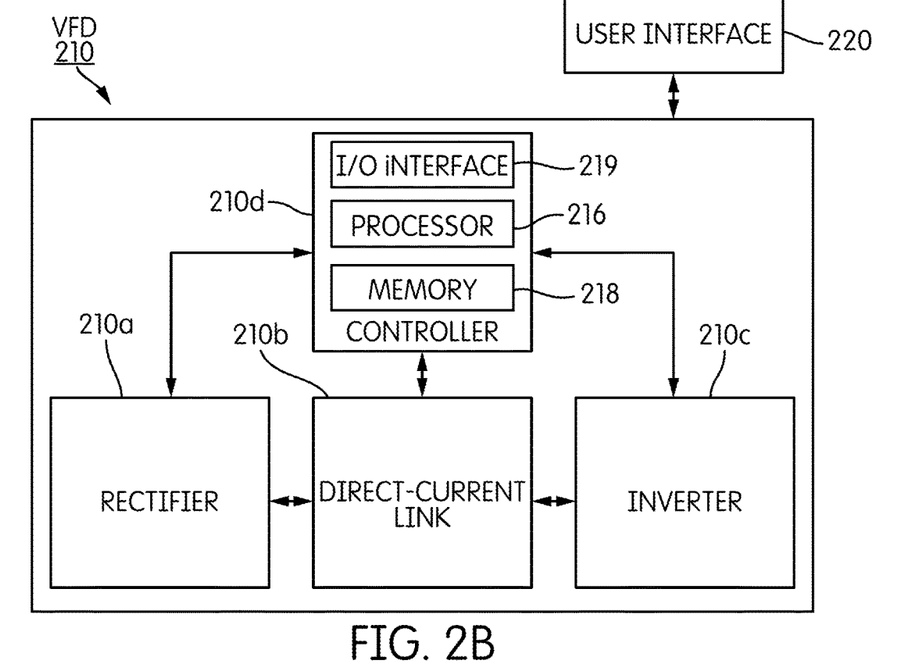
FIG. 2b schematically illustrates a variable-frequency driver included in the mining machine of FIG. 1.

The VFD 210 is an adjustable-frequency drive. As illustrated in FIG. 2b, the VFD 210 can include a rectifier 210a, a direct-current link 210b, an inverter 210c, and a controller 210d. The VFD 210 operates the motor 205 at variable speeds by generating AC voltage at variable magnitudes and variable frequencies different than the AC voltage provided by the power source 200. For example, the VFD 210 can be configured to output AC voltage having magnitudes approximately (near) 0V to approximately 900V (with respect to ground) and frequencies from approximately (near) 0 Hz to approximately 120 Hz.

The controller 210d governs the overall operation of the VFD 210. The controller 210d sets the magnitude and frequency of the AC voltage outputted to the motor 205. In some embodiments, the VFD controller 210d includes a processor 216, non-transitory memory 218, and an input/output ("I/O") interface 219. The memory 218 stores instructions executable by the processor 216 and various inputs/outputs. The I/O interface 219 allows communication between the controller 210d and other systems and devices, such as other components of the mining machine 100. In some instances, the processor 216 includes one or more of a microprocessor, digital signal processor, field programmable gate array, application specific integrated circuit, or the like.

In some embodiments, the controller 210d receives instructions from a user interface 220. The user interface 220 can include a display, such as a liquid crystal display ("LCD"), one or more light emitting diodes ("LEDs") or other illumination devices, a heads-up display, or a combination thereof. In some embodiments, the user interface 220 includes additional feedback devices, such as speakers for providing audible feedback and/or vibration devices for providing tactile feedback. The user interface 200 can also include one or more input devices, such as a keypad, a touchscreen, push buttons, etc., for interacting with a user. In some embodiments, the instructions received by the controller 210d through the user interface 220 include instructions for an operating speed of the motor 205.

Figure 2C:
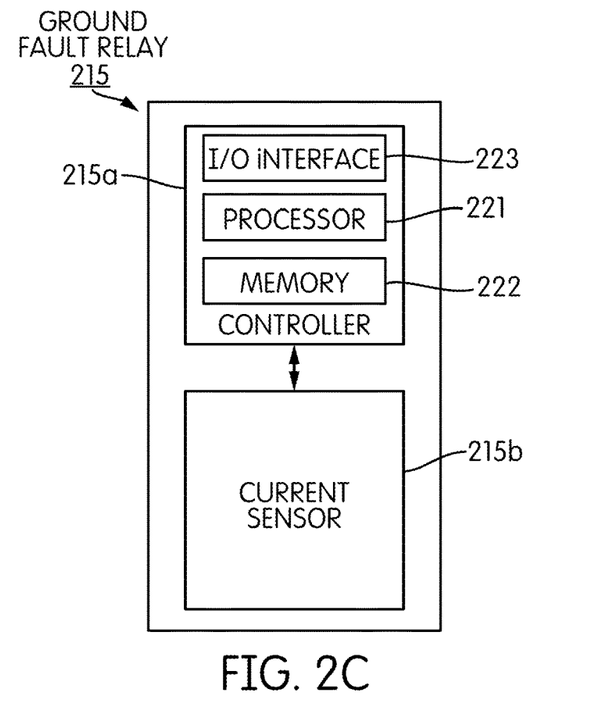

The ground fault relay 215 (also referred to herein as the ground fault monitor 215) monitors operation of the mining machine 100 to detect ground faults 217. As illustrated in FIG. 2c, the ground fault relay 215 includes a controller 215a and one or more current sensors 215b. In some embodiments, the controller 215a includes a processor 221, non-transitory memory 222, and an input/output ("I/O") interface 223. The memory 222 stores instructions executable by the processor 221. The I/O interface 223 allows communication between the controller 215a and other components of the power center 150. The ground fault relay 215 monitors for ground faults 217 by monitoring the ground currents of each power phase provided to the motor 205. If a ground fault 217 develops anywhere between the power source 200 and the motor 205, the ground fault relay 215 provides an indication (e.g., to the VFD controller 210d for subsequent output to a user-interface, or directly to the user-interface and VFD controller 210d simultaneously). In some embodiments, the ground current of a ground fault 217 must be above a predetermined threshold to be detected by the ground fault relay 215 (i.e., the ground current must be above a predetermined threshold to be sensed by the current sensor 125b of the ground fault relay 215). In some embodiments, the predetermined threshold is within a range of approximately 10 mA to approximately 5 A.

In operation, the VFD 210 receives three-phase power from the power supply 200 via phases A, B, C. The VFD controller 210d receives a motor speed via the user-interface 220. The VFD controller 210d sets a magnitude (with respect to ground) and frequency of an adjusted AC voltage (having three-phases U, V, W, and an excitation component) corresponding to the received motor speed. The VFD 210 provides the adjusted AC voltage to the motor 205, via phases U, V, W, for operating the motor at the received motor speed. The motor 205 receives the three voltage phases (U, V, W) at the three motor inputs 205a, 205b, and 205c and operates at the received motor speed. For example, when operating the motor 205 at a low speed, the VFD 210 provides a voltage to the motor 205 having a lower magnitude and a lower frequency than the magnitude and frequency of a voltage provided by the VFD 210 when the motor 205 is operating at a high speed. Variable-frequency drives are well-known in the art. Accordingly, additional details regarding the operation of the VFD 210 to provide adjusted power to the motor 205 are not provided herein.

While adjusted power is provided to the motor 205 by the VFD 210, the ground fault relay 215 monitors for and detects ground faults 217. As described in more detail below, if the ground current of a ground fault 217 is above a predetermined threshold, the ground fault relay 215 provides an indication (e.g., to the VFD controller 210d indicating a ground fault condition).

Figure 3:
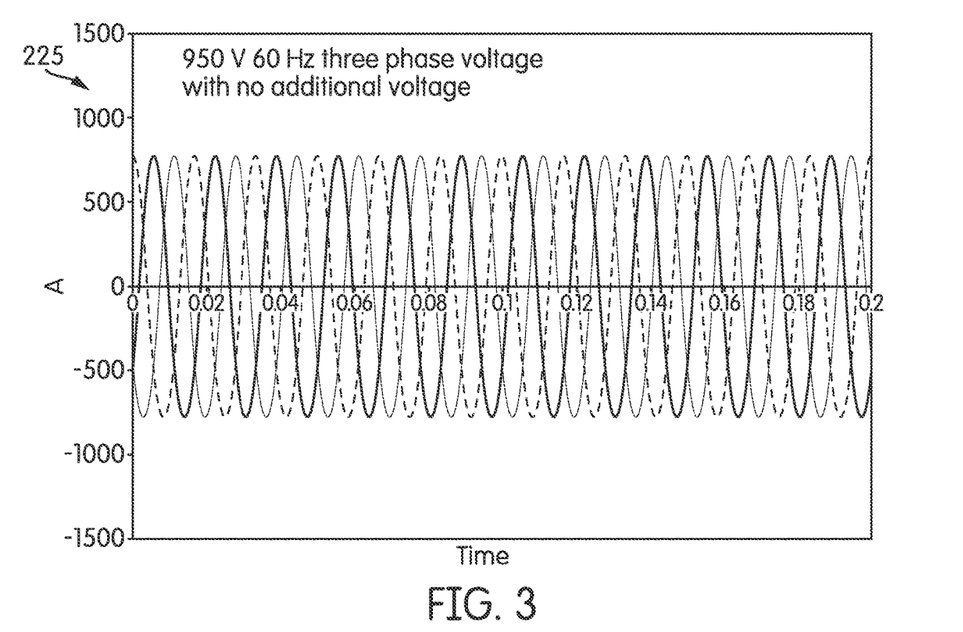
FIG. 3 is a graph illustrating a first three-phase voltage.
Figure 4:
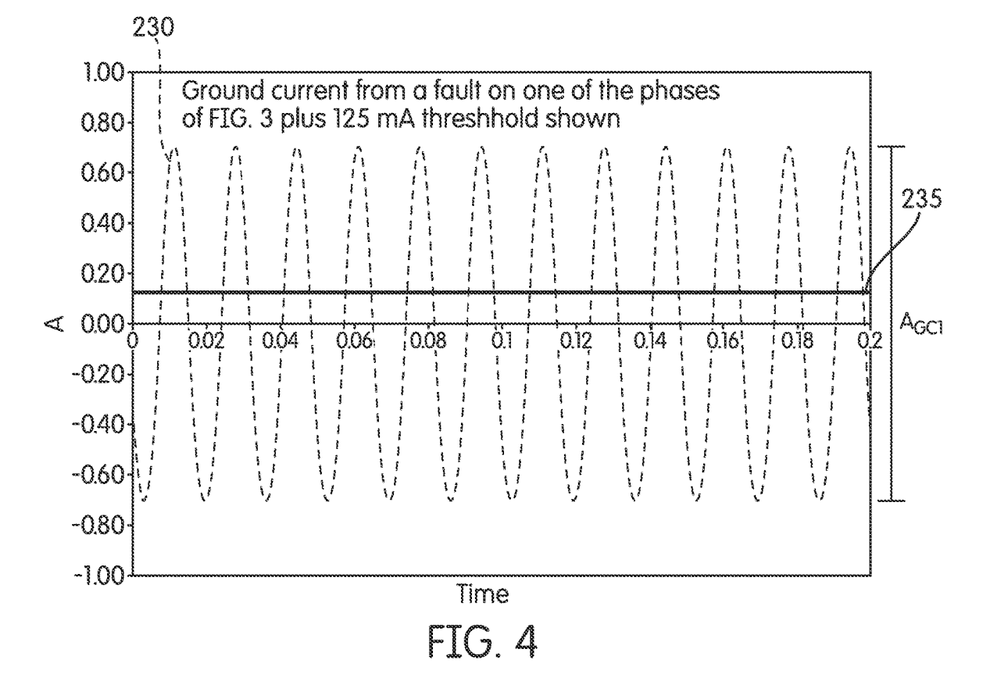
FIG. 4 is a graph illustrating ground current of a ground fault occurring between a phase of FIG. 3 and ground.
Figure 5:
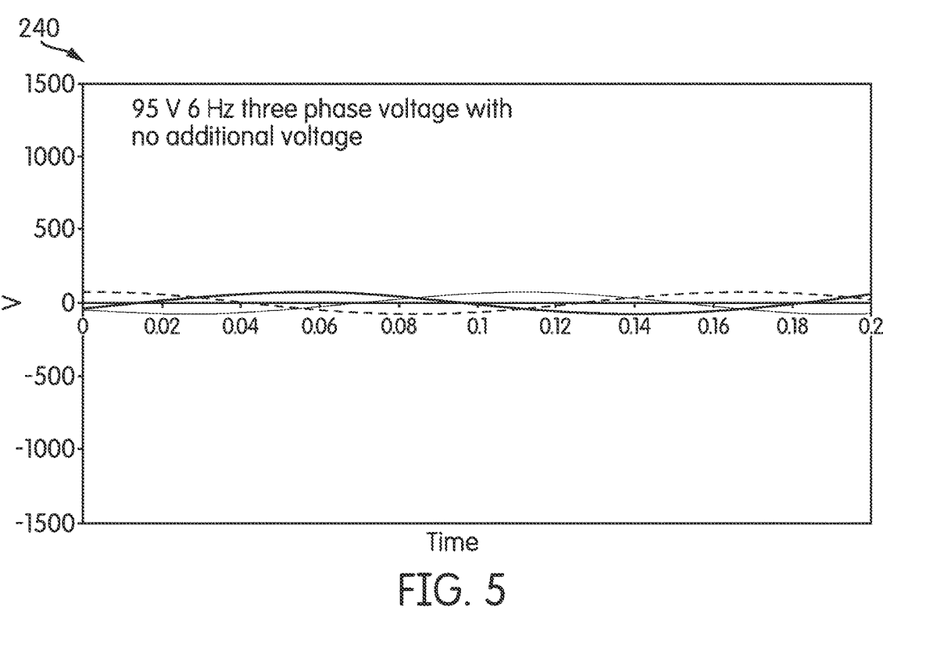
FIG. 5 is a graph illustrating a second three-phase voltage.
Figure 6:
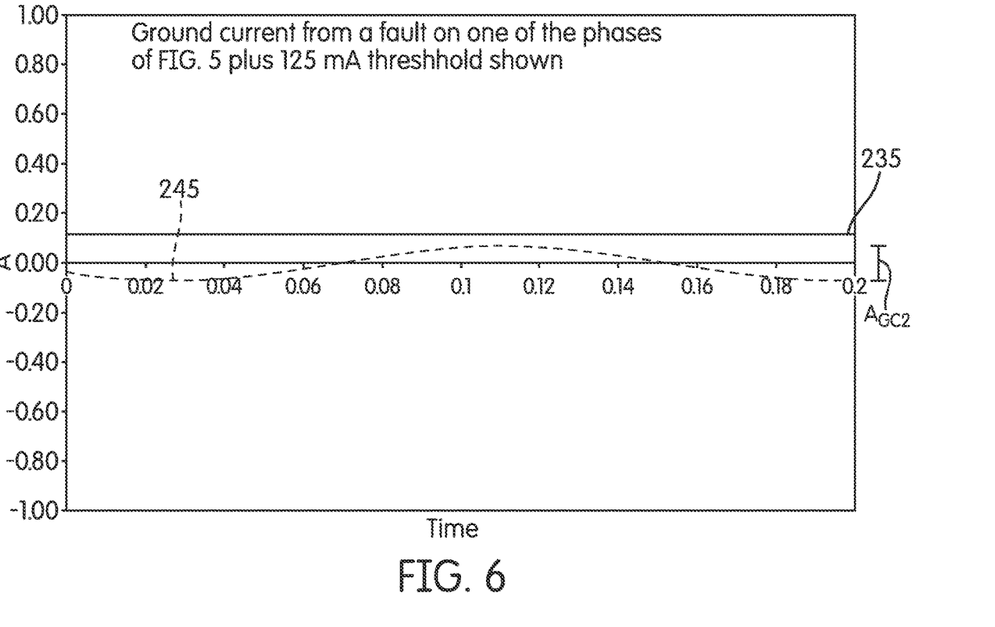
FIG. 6 is a graph illustrating ground current of a ground fault occurring between a phase of FIG. 5 and ground.

FIG. 3 is a graph illustrating a first three-phase voltage 225 for operating the motor 205. The first three-phase voltage 225 includes a first voltage magnitude (e.g., 950V) and a first frequency (e.g., 60 Hz). If a ground fault 217 occurs while operating the motor 205 at the first three-phase voltage 225, the ground fault 217 produces a first ground current 230 at a first ground current magnitude, for example 500 mA ($A_{GC1}$), illustrated in FIG. 4. In the example shown in FIG. 4, the first ground current magnitude is above the predetermined threshold 235 (125 mA). In other embodiments, the predetermined threshold is higher or lower than 125 mA, as shown in FIG. 4. The current sensor 215b is able to sense the first ground current 230 because the first ground current magnitude is above the predetermined threshold 235. Upon sensing the first ground current 230, the current sensor 215b provides a signal, or indication, to the ground fault relay controller 215a. The ground fault relay controller 215a then provides a signal, or indication, to the VFD controller 210d for subsequent output to a user-interface, or directly to the user-interface and VFD controller 210d simultaneously FIG. 5 is a graph illustrating a second three-phase voltage 240 for operating the motor 205 at a low speed. The second three-phase voltage 240 has a lower voltage magnitude (e.g., 95V) at a lower frequency (e.g., 6 Hz) than the first three-phase voltage 225. If a ground fault 217 occurs while operating the motor 205 at the second three-phase voltage 240, the ground fault 217 produces a second ground current 245, as illustrated in FIG. 6. As illustrated in FIG. 6, the magnitude of the second ground current 245 is lower than the magnitude of the first ground current 230 produced with respect to the first three-phase voltage 225, and is also below the predetermined threshold 235. In this situation, the ground fault relay 215 does not provide an indication when the ground fault 217 occurs.

Figure 7:
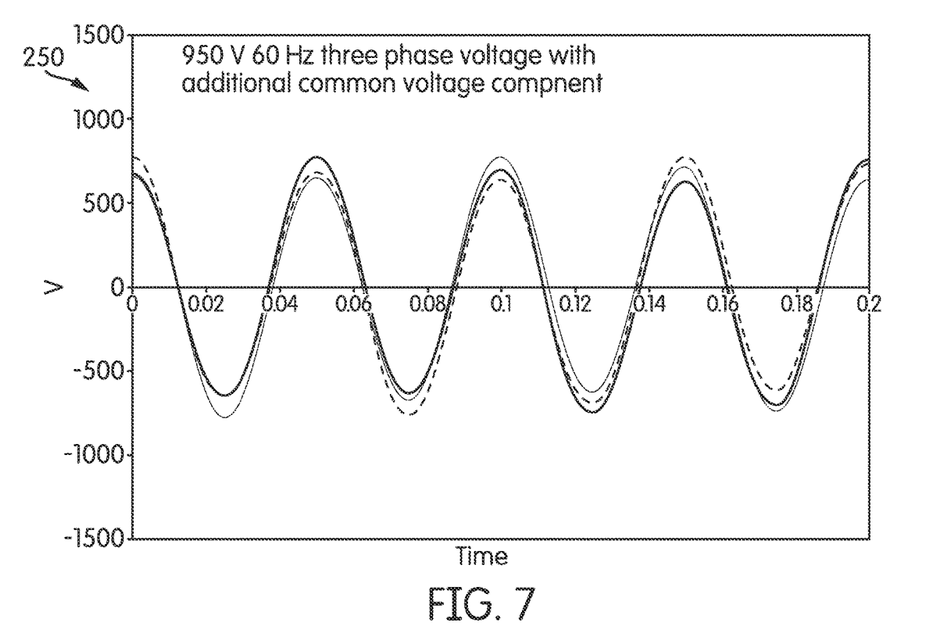
FIG. 7 is a graph illustrating a third three-phase voltage having an injected common signal.

To correct the situation, the VFD 210 of the preferred embodiment adds a common voltage on each phase ($V_U$, $V_V$, and $V_W$) of the output voltage to the motor 205 (FIG. 7). The common voltage is added by the VFD controller 210a during setting of the magnitude and frequency of the adjusted voltage. Since the power to the motor 205 is conveyed by the voltage difference between the phases ($V_U$, $V_V$, and $V_W$) of the adjusted voltage, and the same common signal is injected onto each phase, the operational speed of the motor 205 is not effected. In some embodiments, the common signal is an AC waveform, such as a low-frequency (e.g., 20 Hz) AC waveform. In other embodiments, the common signal is a pure direct current. The common signal increases the current magnitude produced by the ground current when a ground fault 217 occurs.

Figure 8:
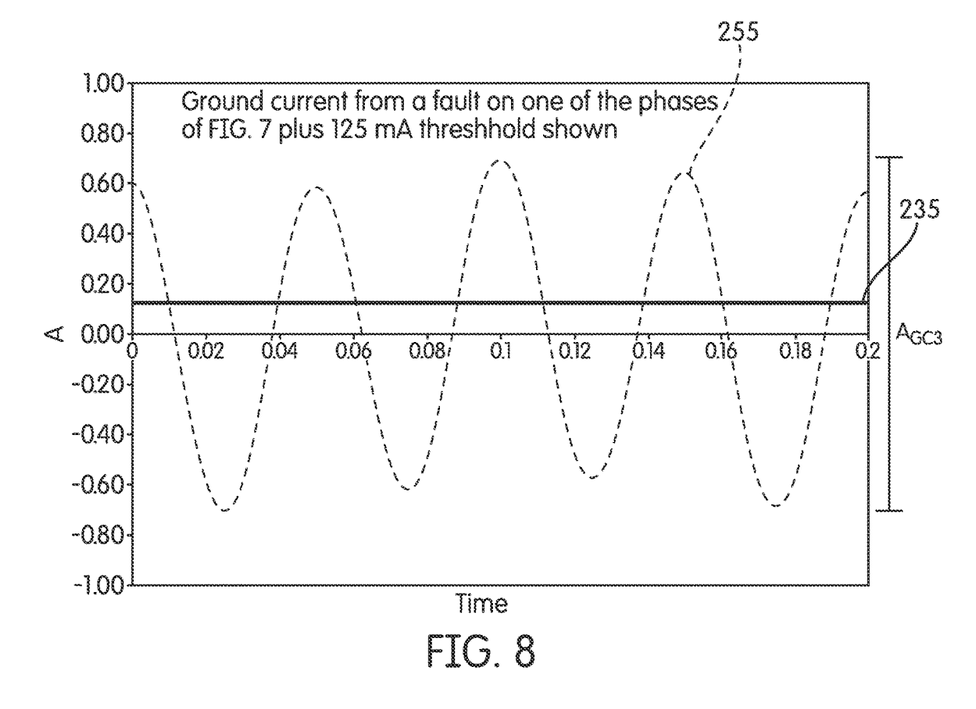
FIG. 8 is a graph illustrating ground current of a ground fault occurring between a phase of FIG. 7 and ground.

FIG. 7 is a graph illustrating a third three-phase voltage 250 for operating the motor 205. The third three-phase voltage 250 has a common voltage added by the VFD 210 before powering the motor 205. As illustrated in FIG. 7, the third three-phase voltage 250 includes a third voltage magnitude and a third frequency different from the magnitude and/or frequency of the first three-phase voltage and the second three-phase voltage. However, the third three-phase voltage 250 can be used to operate the motor 205 at a low speed similar to the second three-phase voltage 240. If a ground fault 217 occurs while operating the motor 205 at the modified three-phase voltage 250, the ground fault 217 produces a third ground current 255, as illustrated in FIG. 8. The current magnitude of the third ground current 255 is above the predetermined threshold 235, therefore, the ground fault relay 215 provides an indication once the ground fault 217 occurs, even though the motor 205 is being operated at a low-speed.

In some embodiments, the output voltage to the motor 205 is low-pass filtered. The common signal, however, can be a low-frequency signal. Therefore the common signal is not affected by a low-pass filter.

In some embodiments, the ground fault relay 215 is unable to detect high-frequencies. As discussed above, the common signal is a low-frequency signal. Therefore the ground fault relay 215 is able to detect ground faults 217 occurring when the motor 205 is operated by an output voltage having an injected common signal.

Thus, the invention provides, among other things, a mining machine including an adjustable speed drive for driving a motor. The adjustable speed drive allows the motor to operate at different speeds by generating AC voltage at frequencies other than the fixed 50 Hz or 60 Hz provided by a power supply. By adding an additional identical voltage component to each phase of the voltage output to the motor, ground faults are easier to detect even when the motor is operating at a low speed. In addition, because the same voltage component is added to each phase, the added voltage component has no effect on the motor operation.

Various features and advantages of the invention are set forth in the following claims.

What is claimed is:

1. A mining machine comprising:
   a motor; and
   a ground fault relay including a ground fault relay controller and at least one current sensor; and
   an adjustable speed drive including a variable frequency drive controller configured to control the adjustable speed drive to provide a voltage to the motor, the voltage having an excitation component including a magnitude and a frequency for operating the motor at a desired speed, the voltage further including an additional voltage component for use in detecting a ground fault condition, the additional voltage component modifying the ground fault current by increasing a magnitude of the ground fault current;
   wherein the variable frequency drive controller receives an indication from the ground fault relay controller when the at least one current sensor detects a ground fault current that exceeds a predetermined threshold.

2. The mining machine of claim 1, wherein the additional voltage signal is one of a low-frequency alternating current waveform and a direct current.

3. The mining machine of claim 1, wherein the voltage is a three-phase voltage.

4. The mining machine of claim 1, wherein each phase of the three-phase voltage includes the additional voltage signal.

5. The mining machine of claim 1, wherein the adjustable speed drive is a variable-frequency drive.

6. The mining machine of claim 1, wherein the motor is an alternating current motor.

7. A method for detecting a ground fault of a mining machine including a motor, an adjustable speed drive, and a ground fault relay, the method comprising:
   generating, at the adjustable speed drive, a three-phase voltage for the motor, each phase of the three-phase voltage including an additional voltage signal, the additional voltage signal modifying a ground fault current;
   providing, by the adjustable speed drive, the three-phase voltage to the motor;
   detecting, by at least one current sensor of the ground fault relay, a ground fault current between the motor and the adjustable speed drive; and
   outputting, by a ground fault relay controller of the ground fault relay, an indication of a ground fault when the at least one current sensor detects a ground fault current that exceeds a predetermined threshold.

8. The method of claim 7, wherein the additional voltage signal modifies the ground fault current by increasing a magnitude of the ground fault current.

9. The method of claim 7, wherein the additional voltage signal is one of a low-frequency alternating current waveform and a direct current.

10. A system for generating variable frequency voltage for an alternating current motor, the system comprising:
    a variable frequency drive including a variable frequency drive controller electrically coupled to the variable frequency drive and configured to
       control the variable frequency drive to generate a three-phase voltage for the alternating current motor;
       control the variable frequency drive to generate an additional voltage signal, the additional voltage signal added onto each phase of the three-phase voltage to increase a magnitude of a ground fault current; and control the variable frequency drive to provide the three-phase voltage injected with the additional voltage signal to the alternating current motor.

11. The system of claim 10, further comprising a user interface configured to receive instructions from a user, the instructions including an operating speed for the motor.

12. The system of claim 11, wherein the variable frequency drive controller is further configured to receive the instructions from the user interface and control the variable frequency drive to generate the three-phase voltage for the motor based on the instructions.

13. The system of claim 10, further comprising a ground fault relay configured to measure the magnitude of a ground fault current with a current sensor of the ground fault relay, and output, with a ground fault relay controller, an indication of a ground fault to the variable frequency drive controller when the magnitude exceeds a predetermined value.

* * * * *